Fig. I

Inventor
VANNEVAR BUSH

By M. C. Hayes
Attorney

Inventor
VANNEVAR BUSH

By

M. O. Hayes
Attorney

Feb. 17, 1959 V. BUSH 2,873,912

ELECTRONIC COMPARATOR

Filed Oct. 23, 1946 9 Sheets-Sheet 3

Inventor
VANNEVAR BUSH

By M. C. Hayes
Attorney

Inventor
VANNEVAR BUSH

By M. A. Hayes
Attorney

Feb. 17, 1959 V. BUSH 2,873,912

ELECTRONIC COMPARATOR

Filed Oct. 23, 1946 9 Sheets-Sheet 5

Inventor
VANNEVAR BUSH

By [signature]

Attorney

Feb. 17, 1959 V. BUSH 2,873,912

ELECTRONIC COMPARATOR

Filed Oct. 23, 1946

9 Sheets-Sheet 6

Inventor
VANNEVAR BUSH

By M. O. Hayes
Attorney

Feb. 17, 1959 V. BUSH 2,873,912

ELECTRONIC COMPARATOR

Filed Oct. 23, 1946 9 Sheets-Sheet 7

Inventor
VANNEVAR BUSH

By [signature] Attorney

Feb. 17, 1959

V. BUSH 2,873,912

ELECTRONIC COMPARATOR

Filed Oct. 23, 1946

9 Sheets-Sheet 8

Inventor
VANNEVAR BUSH

By

M. A. Hayes
Attorney

Inventor
VANNEVAR BUSH

By M. A. Hayes
Attorney

United States Patent Office 2,873,912

Patented Feb. 17, 1959

2,873,912

ELECTRONIC COMPARATOR

Vannevar Bush, Washington, D. C., assignor to the United States of America as represented by the Secretary of the Navy Application October 23, 1946, Serial No. 705,145

16 Claims. (Cl. 235—61.7)

This invention relates to a device used with a study of certain analytical problems, and in particular to one in which punched holes and patterns in one tape may be compared with those in another. The device is known as a comparator and is a very flexible machine in that it can be used in the investigation of many different problems. This can be done at a speed many times greater than by hand.

It is sometimes necessary to compare precise arrangements of punch marks in the tape or film, and it is a principal object of this invention to provide means for running two tapes before photoelectric cells to compare one with the other.

Another important object is to count and print the coincidences or coincident patterns between two sets of data or characters in sequential arrangement.

A further object is to reproduce in a printed form on paper a record of these coincidences.

Further objects will become apparent from the following specification taken into conjunction with the appended claims.

In the comparator sets of data are punched longitudinally on paper tape with each of the different characters being represented by a punched hole in a certain position in a horizontal line across the tape. In the preferred embodiment a paper tape 70 mm. wide is used, however, other widths or materials may be used for the tape. Holes can also be punched on the tape for each line or position of the data thereon. These are called count holes. The two tapes to be compared are spliced in loops of the same standard lengths, and the comparator drives these two tapes around with each tape acting as a dynamic mask for the other. One tape is then compared with the other at every possible position or at equal intervals by advancing the one tape with respect to the other at the end of every pass. A pass designates a complete cycle of the tape through the viewing system.

The tapes are run between a light source and a bank of photoelectric cells which search for the coincidences, and when one is found the cells produce a pulse. The pulses are amplified by amplifier circuits, and Rossi circuits determine if the pulses set the predetermined coincident pattern for which the search is being made. The outputs of the Rossi circuits are counted by electronic ring counters. These results are recorded by a printer upon each pass of the tape. A circuit is also provided in the machine to count the number of positions that the data on the two tapes overlap and this count is also recorded by the printer. The complete machine is contained in three cabinets connected by cables as shown in Figure 1. The unit which embodies the tape passing mechanism and the electronic viewing system is called the comparator. The unit which contains the electronic counting circuit and the recording mechanism is called the counter printer. The unit which contains the electronic stages between the comparator and the counter printer is called the amplifier.

This invention may be more easily understood by the description taken in connection with the following drawings wherein.

Figures 3A to 3D comprise a schematic diagram of the circuit employed.

Figure 4:
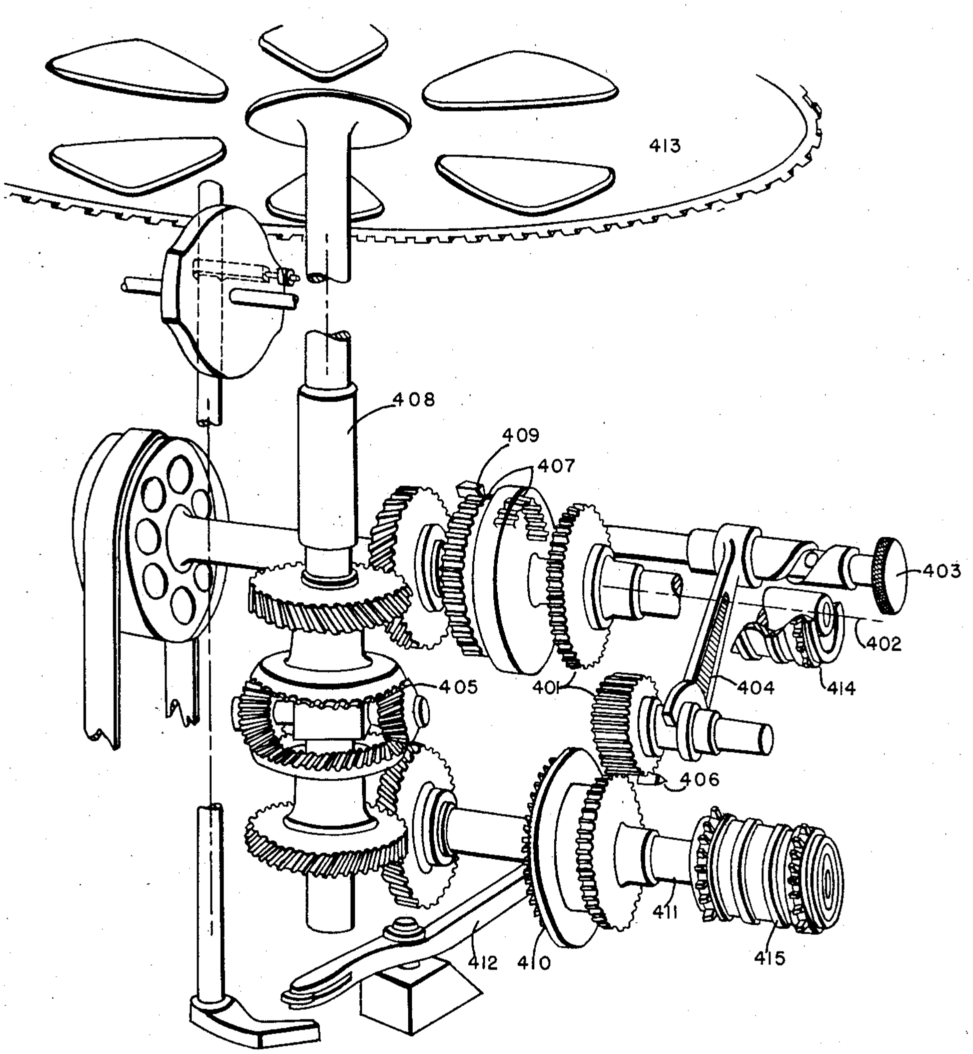

Figure 4 illustrates the tape driving mechanism.

Figure 5:
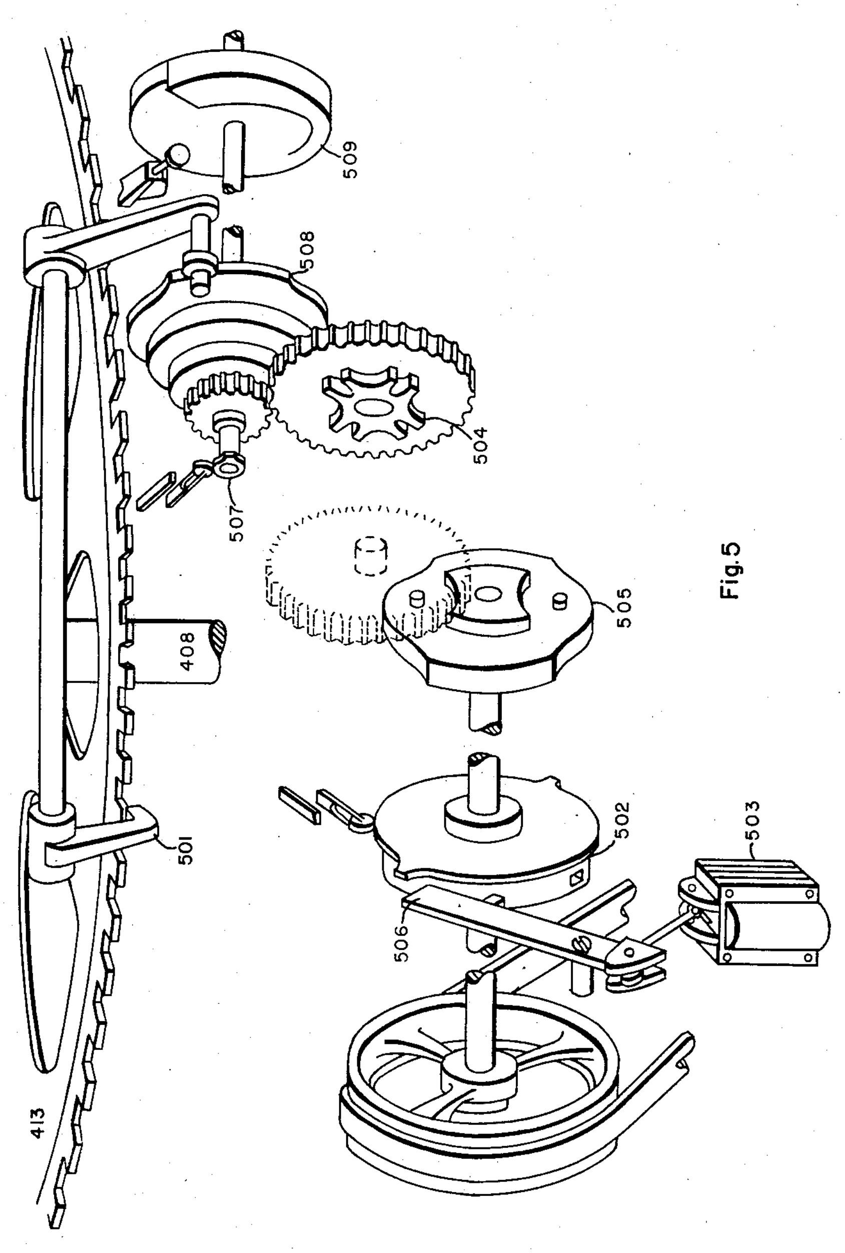

Figure 5 shows details of the tape advance mechanism.

Figure 6:
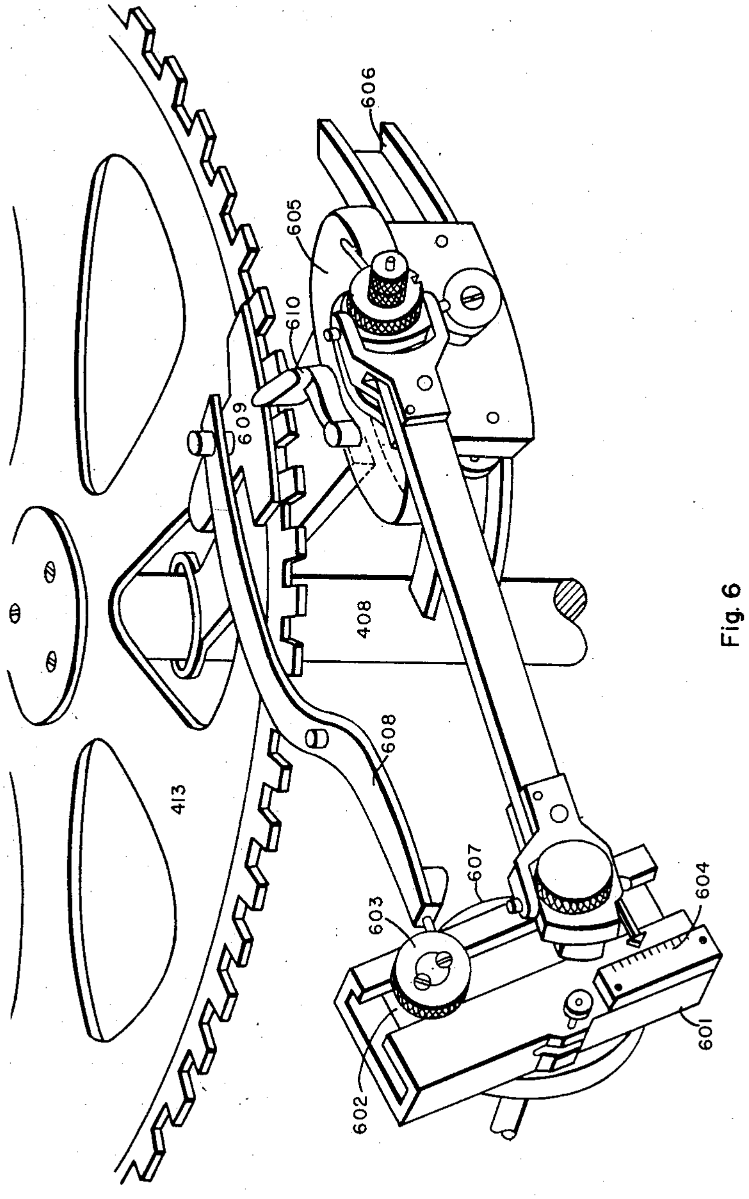

Figure 6 shows further details of the tape advance mechanism.

Figure 1:
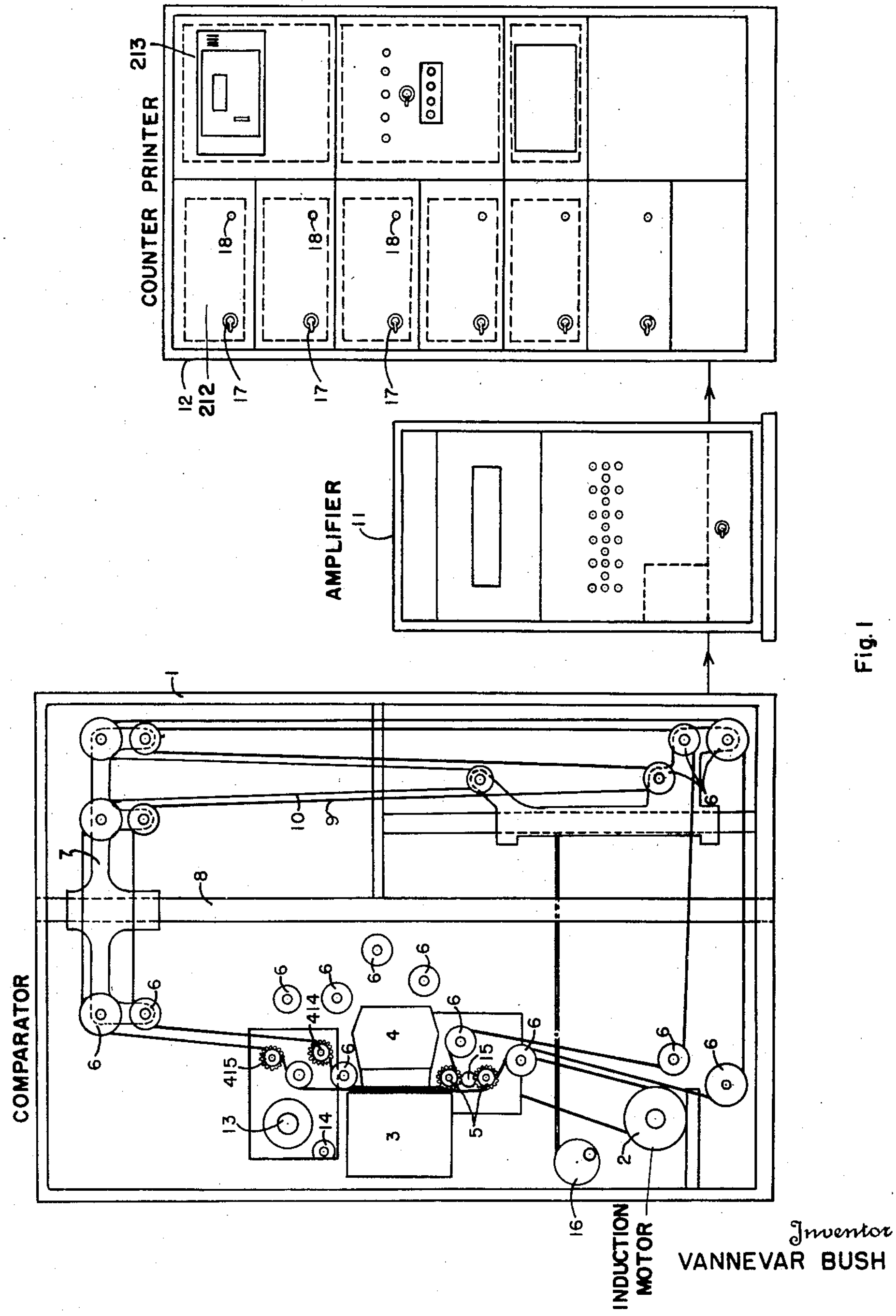
Figure 1 shows the outward appearance of the equipment.

The comparator unit is shown in Figure 1 and contains mechanical equipment to drive, advance, and align tape loops 9 and 10. The unit also contains a viewing system composed of an optical and electronic arrangement which produces electric impulses for each coincident character passed before it. The amplifier is shown at 11, and the counter printer at 12.

In the mechanical position of the comparator the two superimposed tape loops may be run synchronously past the viewing system, 3—4, or the outer tape loop 10 may be held stationary and the inner tape loop 9 passed under it. With either operation the outer tape loop 10 may be advanced with respect to the inner tape loop 9 at each revolution of the inner loop 9 by a preset number of steps which may range from 1 to 10 tape columns.

The tape loops are driven by sprocket wheels shown as on Figure 1 at 414 and 415. The mechanisms which advance these sprockets are explained by referring to Figures 4, 5 and 6. Figure 4 shows the drive and part of the advance mechanism, and under the conditions as shown on this figure, only the inner drive sprocket 414 revolves and the outer drive sprocket 415 is locked in position. Figures 5 and 6 show the advance mechanism during the advance cycle. Dynamic-static clutch 407 is an internal gear clutch one side of which is attached by pin to the main drive shaft 402. It is engaged and disengaged manually through the dynamic-static clutch knob 403 and clutch lever 404, which is located behind clutch 407. This clutch provides a medium through which power may be transmitted to the upper gear of the differential assembly 405. When this clutch is disengaged as shown in Figure 4, its free side engages a static lock 409 which locks the upper differential gear in position.

Another dynamic-static clutch 401 is a gear clutch engaged and disengaged in the same manner as, and simultaneously with, clutch 407. One side of clutch 401 is attached by a pin to the main drive shaft 402. The free side meshes with one side of the advance clutch assembly 410, and when disengaged, the free side of this clutch meshes with a static lock 406, locking it in position.

The advance clutch is a face-gear clutch, one side of which is attached by a pin to the outer drive shaft 411. This clutch is kept engaged by a spring tension and is disengaged momentarily by the advance clutch lever 412 during the advance cycle. When disengaged, the free side of the advance clutch is free to revolve about the outer sprocket shaft breaking the gear train from the clutch 401 to the outer drive sprocket shaft 41.

The differential assembly 405 provides a medium through which power may be transmitted to the outer drive sprocket shaft 411. The index shaft 408 composes the axis of the differential and is held stationary by the index wheel locking arm 501 in Figure 5 except during the advance cycle.

Half-revolution clutch is shown at 502 Figure 5 and is a friction clutch which is controlled by the clutch release solenoid 503. Its free side is attached to a shaft which drives one side of Geneva star drive 504 and advance cam 505. The advance cam controls the advance clutch lever 506 and disengages the advance clutch during the advance cycle. The Geneva star drive provides a medium of applying intermittent motion to the advance link drive shaft 507. The advance link drive shaft operates the mechanism shown in Figure 5 and revolves one revolution each time the half-revolution clutch 502 revolves. The advance link drive shaft rotates the locking arm drive cam 508, and the retaining plate arm drive cam 509, and the link adjusting plate 601, in Figures 5 and 6.

The link adjusting plate, the link adjusting slide 602, and the link stud knob 603, compose an adjustable eccentric. The radius of the arc described by the link stud knob determines the amount of advance and is adjustable. The link adjusting indicator 604 is calibrated in columns to indicate the amount of advance. The advance link transmits motion to the index wheel carriage 605 which travels in the guide 606.

The retaining plate arm drive cam 607, the retaining plate arm 608, and the advance dog retaining plate 609 function to allow the advance dog 610 to index the index wheel only on the first half of the reciprocating cycle of the advance link. The locking arm drive cam 508 and the index wheel locking arm 501 release the index wheel 413 immediately before the advance dog starts to index the index wheel. The locking arm again engages the index wheel directly after the advance is complete.

The tape drive mechanism is preferably operated by a small induction motor shown in Figure 1 at 2. This motor, through a belt drive, furnishes power to the main drive shaft, which applies power directly to the inner drive sprocket 414.

When the driving mechanism is in the dynamic position, i. e., dynamic static clutches 401 and 407 are engaged, power is transmitted through clutch 407 to the upper differential gear and to the outer drive sprocket shaft 411. Power is also transmitted through clutch 401 to the normally engaged advance clutch 410. The outer drive sprocket 415 is driven in synchronism with the inner drive sprocket 414. When the driving mechanism is in the static position, i. e., clutches 401 and 407 are disengaged, their free sides become locked by the static locks and the outer drive sprocket is locked in position. The inner drive sprocket continues to rotate, however, with the main drive shaft.

The inner and outer tape feed sprockets shown in Figure 1 at 5 are also geared and rotate synchronously wiht their respective tape drive sprockets. The advance mechanism is operated by a small motor through a belt drive to one side of the half revolution clutches as shown in Figure 5. At the start of a print cycle, to be described later, a signal from the electrical equipment operates the clutch release solenoid 503. This solenoid allows the clutch to rotate, driving the combination advance cam 505 and the drive side of the Geneva star drive. The advance cam arm 506 rides up on the high side of the advance cam actuating the advance clutch lever disengaging the advance clutch. This latter clutch removes any controlling effect that clutch 401 may have on the outer drive sprocket shaft.

The Geneva drive rotates the locking arm drive cam 508 which in turn releases the index wheel 413 by disengaging the index wheel locking arm. The retaining plate arm drive cam 607 allows the retaining plate arm 608 to fall back, and this arm then allows the advance dog retaining plate 609 to fall back. The index wheel advance dog 610 falls into position to drive the index wheel, and the motion of the link stud knob 603 is transmitted through the index wheel guide and advance dog to the index wheel.

The index wheel rotates in an amount corresponding to the position of the link adjusting slide, and rotates the axis differential pinion gears. This causes the lower differential gear to gain speed momentarily, and causes the outer drive sprocket 415 to gain, and advance the outer tape loop a number of columns equal to the setting of the link adjusting indicator 604.

When the link adjusting slide has made one half revolution the retaining plate on drive cam causes the index wheel advance dog to be disengaged and a braking is applied to the index wheel by the locking arm cam and the index wheel locking arm. The advance clutch 410 engages when the advance cam arm drops off the high side of the advance cam. The release arm of the half revolution clutch 502 holds this clutch at the end of its cycle, and the advance cycle is completed. A knob is provided on the front panel of the equipment to disengage the advance clutch and to release the index wheel so that the outer tape loop may be advanced manually. A knob and dial, 13 of Figure 1, is provided and is geared to the index wheel shaft for the purpose of advancing the outer tape. The amount of advance may be read directly from the dial in terms of columns.

Tape cycling cam 14 is shown in Figure 1 and this element controls the timing of the count and print cycles. Gears connected thereto are driven through gearing to the inner tape loop driving mechanism. They are so arranged so that the ratio of the drive may be changed to compensate for different lengths of loops. The cam which is driven through cycling gears is mounted on a vernier device, and actuates a switch which controls a relay in the amplifier unit, as explained below. The vernier allows a cam to be revolved about its shaft so as to cause the switch to operate in the proper phase relation in the inner tape loop.

The tape aligning cam and knob shown at 15 in Figure 1, provide a means for adjusting the outer tape with respect to the inner tape in order that coincident holes punched in the tapes will be directly over one another when passing before the viewing system 3—4. The tape alignment cam is an eccentric cam which may be positioned by revolving the tape alignment knob. The outside tape loop rides against the surface of this cam, and revolving then causes the outer tape to move with respect to the inner tape within the viewing area. A feed pulley 6 keeps a tension on the outer tape by reason of being mounted on an arm and held taut by springs. The most satisfactory position for running the tapes may be found by using the tape alignment cam in conjunction with a tape aligning eye circuit to be explained later.

Separate series of sprockets and idler pulleys 6 are provided on which three standard lengths of tape loops may be placed. Different groups of these pulleys are mounted on separate castings, which are in turn mounted on rack gears and in tracks in such a manner that they may be moved vertically in directions opposite to one another by means of gearing and a control wheel shown at 16. Some of these pulleys 6 may be mounted on arms or eccentrics to facilitate the adjustments of loops.

The optical and electronic system of the equipment provides a means of scanning simultaneously ten columns of holes punched in a tape. Each column is individually scanned for a photo electric cell functioning with the optical system. An eleventh photo electric cell scans the necessary or count hole position of the tape and also provides a signal used in conjunction with other electronic and mechanical apparatus to align the tapes.

Figure 2:
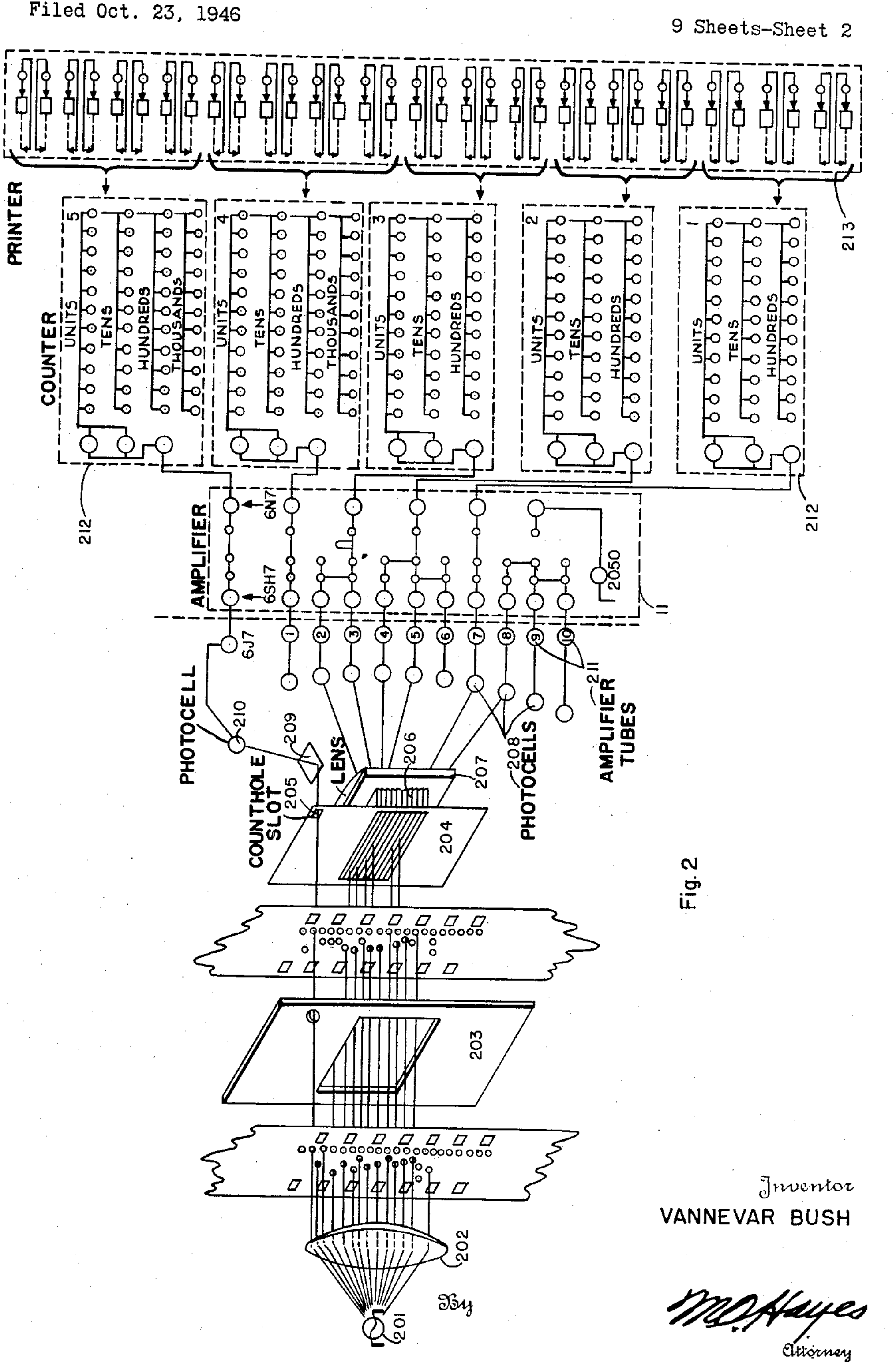
Figure 2 illustrates the optical system employed.

The optical system is shown in Figure 2 and is composed in the preferred embodiment of a projector lamp 201 which may be of 300 watt size, a condenser lens 202, a photo mask 204, 10 dispersing prisms 206, and a cylinder lens 207 The projector lamp is used as a source of light to fall on the area of tape to be scanned. This area may be designated as a frame. The condenser lens causes the light rays from the source to be parallel where they fall upon the tape. The photo mask is made of glass, one side which is coated with optical black, except for 10 slots and 1 count hole slot 205 which are left clear. The slots are of sufficient length and width to allow the scanning of all possible characters in any one column. The ten slots have the same center dimensions as the columns on the tape, so that if a hole is aligned with the first slot all of the holes punched within the next nine columns will be aligned with the respective slots. The coated area between slots is wider than the diameter of the hole to prevent the light from any hole showing in two slots. The count hole slot 205 allows rays of light to pass through each time coincident count holes appear before it.

Ten dispersing prisms 206 are placed behind the photo mask and aligned with the ten slots. These prisms are slightly longer and slightly wider than the slots and are separated by sheets of optical black fiber board and have identical center dimensions as the slots. These prisms are so ground as to cause light from their respective slots to bend toward its corresponding photo electric cell. The circular lens 207 causes the light of the prisms to fall upon the center of the corresponding photo electric cell 208. Light rays passing through the count hole slot strike a mirror 209 which reflects the rays to fall upon the count hole cell 210.

The ten photo electric cells scan ten consecutive columns of characters, or a frame, simultaneously, each cell being limited to its corresponding column. The eleventh cell scans the count hole position only. These cells have an anode potential to provide for optimum operation, which may be about 90 volts. The cathodes of the cells are normally at a negative potential, but light striking the cell causes this potential to become positive. The cathode of each cell is connected to the grid of a separate amplifier tube 211 which may be a type 6J7. The positive pulse applied to the tube is changed to a negative pulse at the anodes thereof and fed through shielded cables to the input circuits of an amplifier chassis 11 in Figures 1 and 2.

The amplifier for the count hole cell is also used in conjunction with the tape aligning cam and an electron eye tube to align tape loops so that coincidences will appear directly over each other before passing before the viewing mechanism. The magnitude of the pulse produced at the anode of this amplifier tube is directly dependent upon the amount of light falling upon the photo cell, and as a result when the tape loops are adjusted by the aligning cam so that the holes are directly over one another the greatest amount of light falls on the cell thereby producing the maximum voltage in the anode circuit of the amplifier. The resulting pulse is then sent to an amplifier which may be a type 6SH7, which in turn feeds it to the electronic eye tube, a type 6E5. This latter tube shows the minimum shadow when the pulses from the amplifier is maximum, or when the tapes are in alignment.

Due to the extreme sensitivity of the photo electric cells and their amplifiers the power supplies are critical. The anode potential for the photo cells is preferably made up of two 45 volt B batteries. The negative grid bias on the amplifiers is preferably furnished by a 4½ volt C battery, and the plate screen voltage thereof is furnished by two electronically regulated power supplies.

Impulses from the amplifiers are fed to the counter printer equipment which consists of five electronic counter chassis 212 and one printer control chassis and one printer 213. The function of the electronic counters is to count the electrical pulses transmitted from the amplifier chassis. The electronic counter chassis 212 provides a means of counting pulses and representing them in such a manner that each positive impulse is registered as the position of a conducting tube in the counting rings. These rings employ tubes known commercially as Thyratrons. Each ring represents a denomination order, and the capacity of the counter is determined by the number of counting rings. As an example, if eighteen positive pulses were impressed on the pulse input line, the Thyratron representing one will be conducting in the tens denominational order counting rings, the Thyratron representing eight will be conducting in the units denominational order counting rings, and the Thyratron representing zero will be conducting in the hundreds, and in the thousands denominational order counting rings.

An impulse sharpener is used with this equipment and will convert any pulse whose onset voltage excursion rises from zero to 100 volts positive in 125 microseconds or less, to positive pulses of the correct magnitude and shape to operate the counting rings.

Figure 3A:
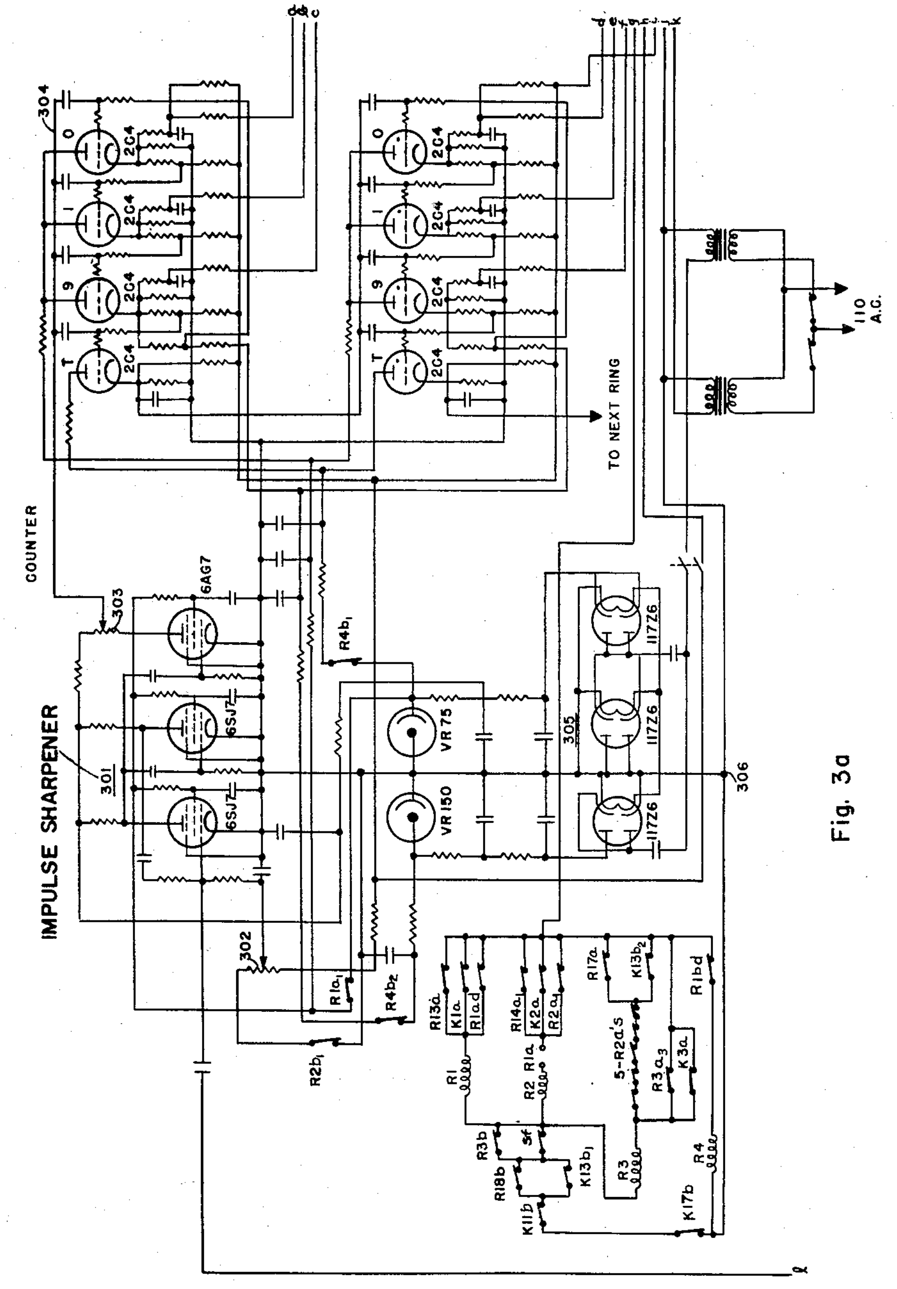

As shown in Figure 3A at 301 the impulse sharpener uses two type 6SJ7 and one 6AG7 tubes. The electrical impulse is applied to the grid of the #1 6SJ7 tube, and this tube is biased negatively. The bias on this tube is controlled between zero and −15 volts by means of a potentiometer 302 which is a threshold control. This control is set at a voltage sufficiently negative to prevent any unwanted signals from being amplified by the sharpener.

The negative impulse developed at the anode of the #1 6SJ7 is applied to both the grid of the #2 6SJ7 and to the grid of #3 6AG7 output amplifiers. Both of these tubes have a bias voltage of zero and are normally conducting.

The positive pulse from the plate of the #2 6SJ7 is applied to the grid of #1 6SJ7, bringing the grid of this tube up to zero potential regardless of the amplitude of the input signal, however, the input signal must have a magnitude large enough to produce a negative excursion in the plate circuit to start this regenerative action This makes the negative excursion of the plate of the #1 6SJ7 practically independent of the amplitude of the input signal.

The positive pulse from the #3 6AG7 output amplifier is applied to the grids of all of the Thyratrons in the counting ring representing the units denominational order. The magnitude of this pulse is controlled by means of the tapped resistor 303 in the plate circuit of the 6AG7. The output pulses should be set halfway between that value which will fire unprimed tubes and that which will fail to fire a primed tube in the counting ring. This impulse sharpener can follow a maximum pulse rate of 8000 per second.

The counting ring shown in Figure 3A is made up of ten type 2C4 Thyratrons so connected that with one of the ten tubes conducting, the next adjacent tube will fire easier than all the rest, and this tube is thus said to be primed. A positive impulse applied to the grids of all of the tubes through a common pulse input line 304 fires the primed tube, and, as this tube fires, a negative pulse generated in its plate circuit, extinguishes the previously conducting tube in the ring. As previously indicated the position of the conducting tube and the ring indicates the number of impulses that have been received. In order to count and represent the number on an indicating system it is necessary that the zero representing tube in each denominational order be made conducting before the unit receives any pulses.

If ten pulses are applied to the units order counting ring the zero tube will again be conducting. However, when the nine representing tube fires it primes a transfer tube T in Figure 3A as well as the zero representing tube. The tenth impulse fires both the zero representing tube and the transfer tube, and as previously described the firing of the zero tube extinguishes the nine tube. The firing of the transfer tube generates a positive pulse which is applied to the grids of all of the Thyratrons in the tens order counting ring, and fires the primed tube in that ring. Thus ten is represented by the one tube in the tens order and by the zero tube in the units order. The transfer tube extinguishes itself immediately after firing, since it does not have to remain conducting to represent a number. If the primed tube in the tens order had been the zero tube the transfer impulse from the units order would have fired the zero tube along with the tens order transfer tube which in turn would have fired the primed tube in the hundreds order.

Figure 3B:
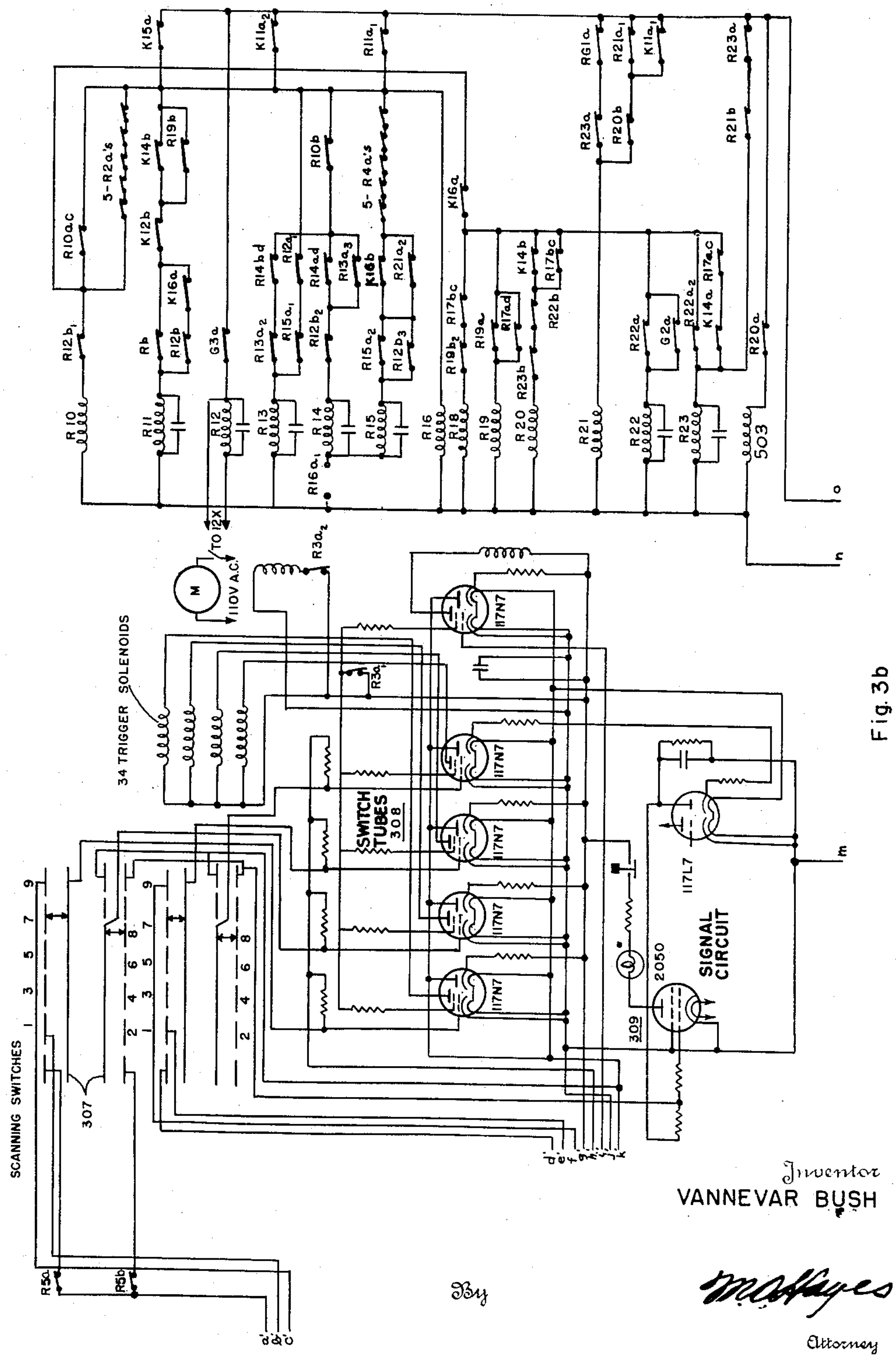
Figure 3C:
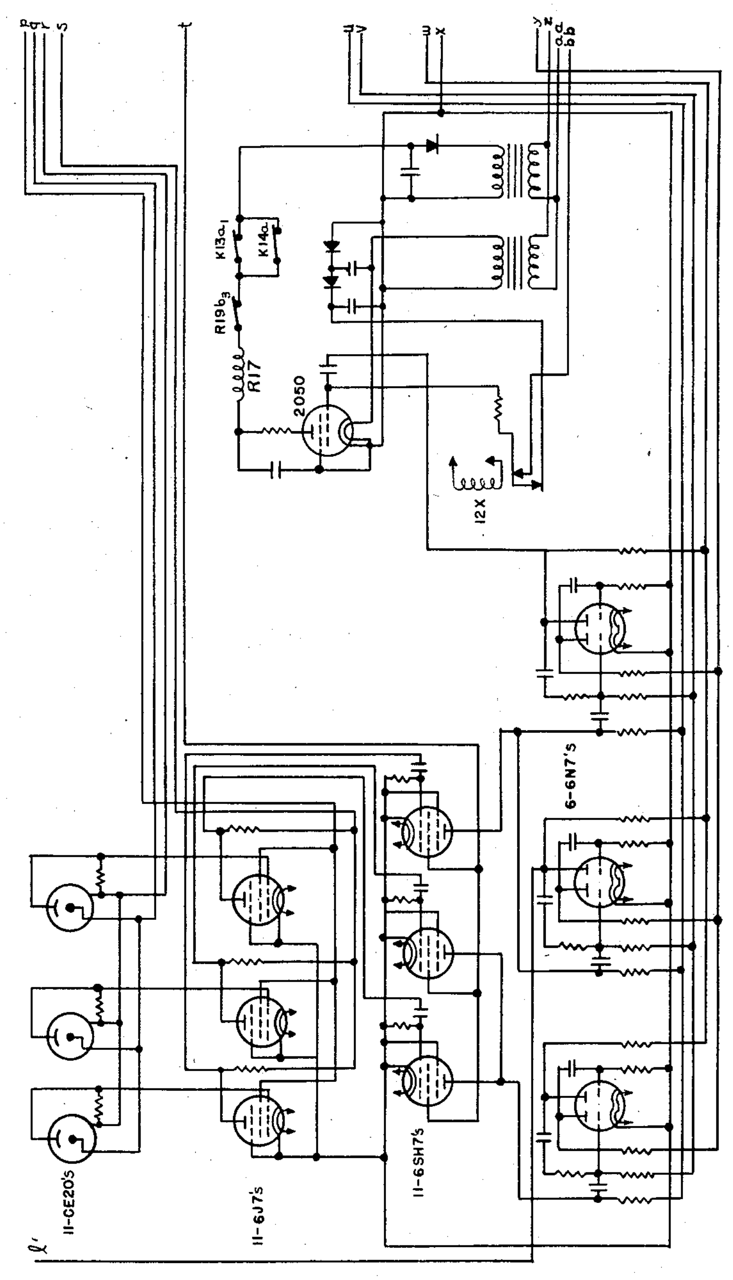
Figure 3D:
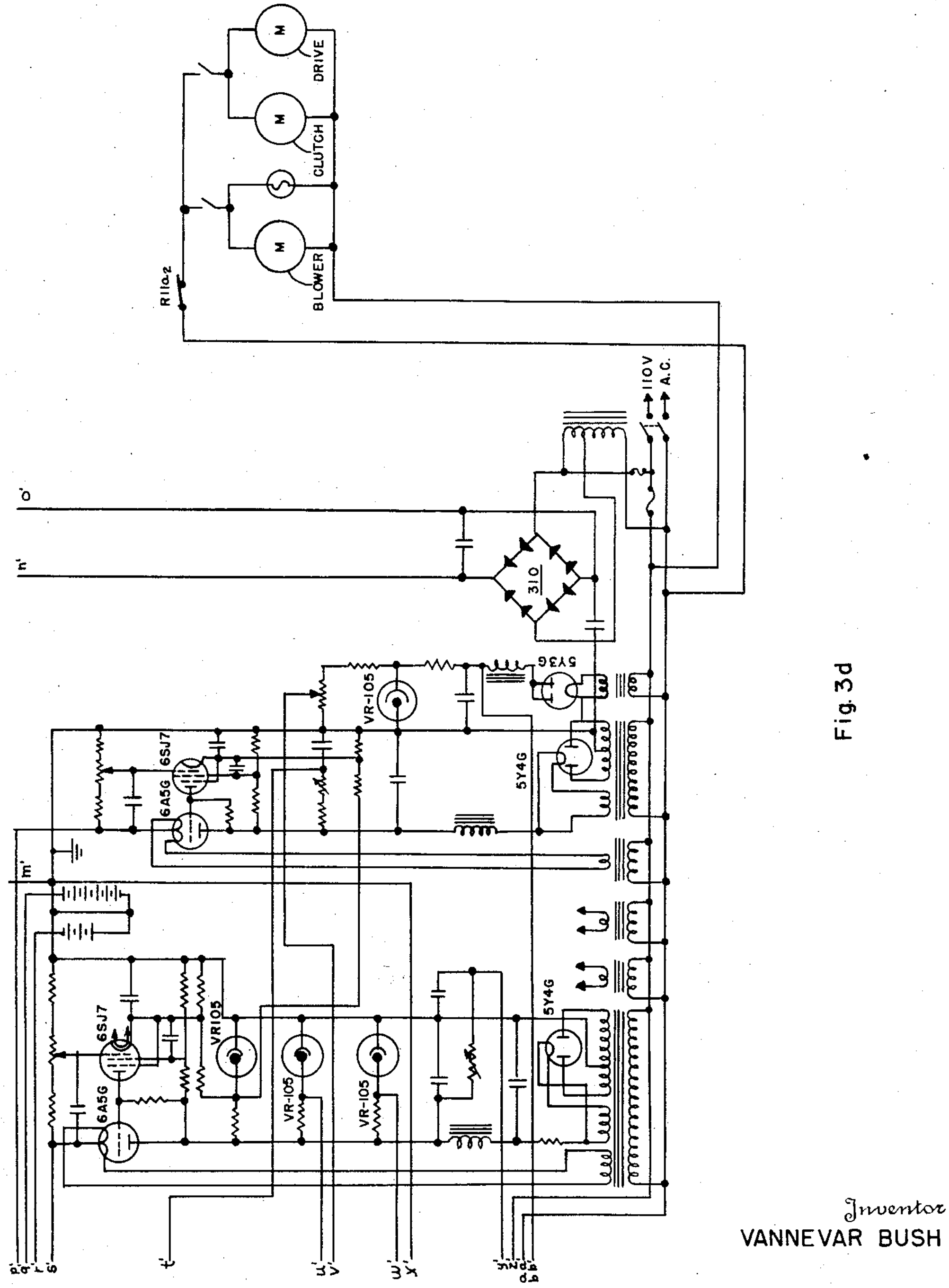

The position of the conducting tube in each denominational order is located by scanning the cathode circuits of the Thyratrons by the scanning switches shown in Figure 3B. The cathode of a conducting tube is 48 volts positive, while that of a non-conducting tube is 9 volts negative. The printer in this instrument is so constructed as to stop the movement of the type wheel whenever the scanning arm makes contact with a positive voltage. It will be noticed in Figure 3A that two scanning points are brought out from the zero tube in each denominational order. This is used in connection with "zero suppression" in the printer and printer control. When printing the number 20 for instance, the printer scans 020, zero non print –2– zero print, hence suppressed the printing of all zeros to the left of the highest order significant number.

A power switch 17 in Figure 1 on the front panel of each electronic counter chassis controls the A. C. power to that chassis, and in addition controls the bias supply to the printer latch tubes. Removing the negative bias voltage from these latch tubes controls the operation of the scanning switch and dashes are printed in the column corresponding to the counter that has been turned off. Moving the power switch to the "on" position completes the bias circuit to the latch tubes and completes the 115 volt A. C. circuit to the filament transformers and voltage quadruple power supply. A green pilot lamp 18 connected across the 6.3 volt filament supply, lights whenever the power switch is turned on.

The control relays in this chassis are operated by relays R13 and R14 in the control chassis Figure 3B. Relay R13, Figure 3B, operates relay R1, Figure 3A, provided the print cycle is complete.

Relay R1, Figure 3A, is self-locking, applies voltage to the screen grids of the impulse sharpener tubes, plate voltage to all of the tubes in the Thyratron counting rings except the transfer tubes, and opens the coil circuit to relay R4. Relay R4, Figure 3A, as it drops out applies negative bias to the now conducting zero representing tubes in the counting rings and plate voltage to the transfer tubes in Figure 3A.

The pulses start arriving a few milliseconds after this operation is complete. Relay R2, Figure 3A, is energized by relay R14 of Figure 3B. Relay R2 applies a high negative bias, −150 volts, to the grid of the #1 6SJ7 tube in the impulse sharpener and starts the scanning and printing cycle.

As soon as the scanning cycle is complete, relay R1 drops out, which in turn energizes relay R4 and drops out relay R2. The counter is again ready for the count cycle, which is initiated by relay R13, Figure 3B.

In order to insure correct operation, the following interlock circuits have been included:

(1) The R1 relay cannot operate unless all of the R2 relays have dropped out and the scanning cycle is complete.

(2) R15 relay in the control chassis cannot operate unless all of the R4 relays are energized.

(3) R2 relay cannot operate unless relay R1 has been energized. This prevents the safety bias and print cycle starting unless it was preceded by a count cycle.

(4) Print and advance control relays in the control chassis cannot operate until all of the R2 relays are energized.

(5) R3 relay cannot operate until all of the R2 relays have been energized. Since R3 relay controls the scanning and print cycle, this cycle cannot start until all of the R2 or safety bias relays have operated.

With these interlock circuits it will be impossible to set up the wrong relay sequence.

The 6.3 volt supply for the vacuum tubes and 2.5 volt supply for the 2C4 Thyratrons are obtained from individual transformers in each counter chassis. The Thyratron filament voltage should be held at 2.5 volts, and since the filament circuit has poor regulation, tubes should not be pulled from a counter without first turning the counter off.

The plate and bias voltages are obtained by the use of two voltage doubling rectifiers connected in series shown at 305 in Figure 3A. The rectifier is connected to the common 115 volt 60 cycle supply line. This means the power to each counter must be polarized. However, since this power is obtained from a voltage regulating isolation transformer no special precautions need be taken to polarize the supply line from the 115 volt 60 cycle mains. A line voltage variation from 90 to 125 volts can be tolerated as far as the counters are concerned since they operate from a regulated supply voltage. For the positive potential two 117Z6GT tubes are used in order to supply the necessary current. The voltage developed across the filter condensers is approximately 240 volts. The current drain is approximately 90 milliamperes. The Thyratron counting rings require a positive potential of 75 volts which is maintained by the use of a VR75 gas regulator tube.

The negative potential is obtained in the same manner except that only one 117Z6GT rectifier tube is used since the current drain is only about 50 ma. The voltage across the filter condensers is 255 volts negative. The bias supply for both the pulse sharpener and the Thyratron counting rings is maintained at 150 volts by the use of a VR150 gas regulator tube.

The common connection 306 between the positive and negative sections of the power supply is connected to the chassis as ground. The voltage regulator tubes are connected so as to remove the 115 volt 60 cycle power from the rectifier system in case one of the tubes is removed from the socket.

The relays are supplied from a common power supply with 125 volts D. C. Actually only 65 volts appear across the relay coils because of a 1500 ohm series resistor.

The functions of the printer control in the counter-printer unit are to index the type wheels by switching on the different latch magnets, to provide zero suppression on the printed record to the left of the last significant figure, to provide an electrical alarm circuit, the alarm indicating the failure of the trip mechanism to stop the differentials, and to provide a D. C. power supply for the printer control, printer and control circuits in the counter printer unit.

Seventeen differential mechanisms in the printer, coupled through intermediate gears and transmission lines, drive and position the impression wheels. The differentials and therefore the impression wheels are connected mechanically to an electrical scanning switch shown in Figure 3B, which is so arranged that an electrical connection is made for each type character in the impression wheel. Electromagnetically controlled trip pawls are released to stop the differentials in positions corresponding to conducting tubes in the Thyratron rings. The scanning point in a Thyratron ring has a potential of 48 volts positive if its associated tube is conducting and 9 volts negative if the tube is non-conducting. These scanning points in the rings are connected through plugs and multiple conductor cables to the scanning switches in the printer. Each printer scanning switch is made in two sections as shown in Figure 3B at 307, the odd section comprising a single pole six position scanning switch, the even section consisting of a single pole five positon scannng switch and also a single pole single make signal switch.

The switch blade in the odd section moves relative to and consequently scans zero non-print, one, three, five, seven, and nine; the even switch blade zero print, two, four, six and eight. Each blade is connected to the grid of a 117N7 trip magnet switch tube shown at 308 which is biased at minus 150 volts through a 2 megohm resistor. The grid voltage of the 117N7 is minus 45 volts when its associated scanning switch connects to a non-conducting Thyratron in a counting ring and plus 8 volts for a conducting tube.

The 34 trip magnet switch tubes are represented in Figure 3B, two tubes being used for each of the 17 sections. The switch tube screen voltage is applied by contact $3a_1$, only during the scanning operation, at all other times conducting is effectively paralyzed. Grid bias voltage, minus 150 volts, is obtained from the ring counters, and in the case of a disconnected or unused counter, this bias voltage is lost and the associated trip magnet switch tubes conduct on application of screen potential. Since the screen potential is applied well before the scanning operation begins the type wheels associated with an off counter will be arrested in their first position and will therefore print out a dash.

Zeros to the left of the last significant figure in the printed record are suppressed by bringing a blank point on the type wheel to the printing position. Each zero tube in the counter rings in Figure 3A has not one, but two points supplying scanning voltage. The one scanning point is connected to the grid circuit of the pentode section of a 117N7 in a similar manner as in the case of the magnet switch tubes. A relay coil provides the plate load for this pentode and consequently is energized when a zero tube is conducting and the $3a_1$ contact applies screen voltage. The voltage from the other zero scanning point is routed through series and parallel connections in the relay circuits to either a zero print or a zero non-print scanning point.

The diode sections of the 45 117N7's provide a 3 amp., 125 volt D. C. power supply. The diode in the 117L7, Figure 3B provides bias for the type 2050 Thyratrons in the warning signal circuit 309. A type 2050 is fired when its associated differential has not been latched in on any one of the scanning points. Several conditions can exist, any one of which will cause the signal system to operate.

They are:

(1) If a counter fails to preset then there will be a counting ring with no tubes conducting. The scanning points will all be minus 8 volts and the grid of the switch tube will be minus 45 volts, well below cut off.

(2) Likewise improper voltage at a cathode scanning point will cause the signal to operate.

(3) Loss of continuity in the multiple cables between the printer and counters.

(4) Failure of printer scanning switch to make a positive contact.

(5) Failure of trip magnet switch tube.

(6) Open magnet coil or open anode circuit of switch tube.

(7) Mechanical failure in the printing mechanism.

For proper operation, the extreme differential position corresponding to the closing of the signal switch is never reached. When the signal switch is closed, the grid of the 2050 swings from −120 volts to cathode potential, thereby lighting the signal tube.

No. 3 relay located in the printer control chassis applies screen voltage to the switch tubes, energizes the printer clutch release solenoid and makes the ground return for the signal system switches.

This description of the 21 column printer furnished with the instrument will be largely confined to the electro-mechanical aspects rather than the operation of each individual mechanical unit.

The mechanical cycle of the printer is carried out and completed by one revolution of its cam line, this movement is accompanied by a cam and roller type single revolution clutch. No. 3 relay in the printer control chassis, when energized, applies voltage to the clutch release solenoid in the printer, initiating the mechanical cycle.

Since each printer differential has two scanning channels, one for the even integers and zero print, one for the odd and zero non-print, it is necessary that two trip pawls and two trip magnets be provided for each column. The odd trip magnets are arranged in a row of 17 at the back and top of the printer. The row of 17 even trip magnets is placed at the back and below the odd row. As the scanning switch connects a switch contact associated with a conducting thyratron, the 117L7 switch tube grid swings from a negative 45 volts to zero or several volts positive, the trip magnet is energized and its armature releases the differential stop pawl. The differential is thereby positioned and through the transmission line and intermediate gears the type-wheel is positioned.

At the end of the scanning operation the printing impression is made and switch S*f* in Figure 3A opens just as the scanning operation is complete. S*f* opening drops out R3 relay, the 5R2*a*'s bias relays and the 5 R1 plate voltage relays in the counters. S*f* does not immediately make but does so before R3 is energized in the next cycle, therefore R3*b* contact in shunt with S*f* provide the interlock connection to ground for R4 and R2 relays in the counters until S*f* closes.

On the return stroke of the differentials R3 relay is open. Therefore the 34 magnet switch tubes have no screen voltage and will not conduct on the back stroke of the scanning switch. In a similar manner the 12 decoding relay tubes for zero suppression are paralyzed at all times other than scanning in order to reduce their number of operations to a minimum.

The printer is capable of recording 21 columns of data, or 17 columns for the ring counters and 4 columns for the serial numbering device.

The serial number is assigned to the right hand printing unit, the 4 digit ring counters to the second and third units from the right, and the three digit ring counters to the fourth, fifth, and sixth units from the right.

Each line of data that is recorded by the printer bears an identifying serial number at the edge of the paper tape. For example, suppose that 2,568 lines of data were recorded in succession by the printer. The first line bears the identification number 1, the second line 2, etc., and the 2,568th line bears the number 2,568.

The serial number device has four digits, that is capable of numbering up to 9,999 lines of printed data. A convenient means for resetting the serial counter by hand is provided.

Relay R11 controls the starting and stopping of the machine. Its main function is to turn on the tape motor drive, the lamp, blower, etc. In addition, it supplies voltage through its $\mathbf{11}a_1$ contacts to relays R13, R14, R15, and R16.

In order to start the machine, the start switch K11 is depressed momentarily. Relay R11 then pulls up through $\mathbf{K11}a_2$ contact and self-locks through $\mathbf{R11}a_1$.

In order to stop the machine, it is only necessary to drop out relay R11. As is shown, this can be done in one of three ways: First, by momentarily depressing the stop switch K12 which opens up the K12*b* contact in the circuit. Second, by means of a "Veeder-Root" predetermining counter. The purpose of the latter stop control is to automatically shut down the machine after a predetermined number of operations have been performed. Third, by means of an electronic shutdown which opens the $\mathbf{19}b_1$ contact in the circuit.

As the tape loop is driven around, some means must be provided for indicating when the active section has passed completely by the gate, and hence that it is safe to initiate the printing. To do this a cam is driven in synchronism with the tape so that the cam makes one revolution every time the tape loop makes one revolution. This cam switch is used to energize relay R12 to indicate the start of the counting period and restore it to start the printer.

When relay R11 operates to start the machine, its contact $R11a_1$ completes the circuit to the bus feeding relays R13, R14, R15, and R16. When $R11a_1$ closes, relay R16 will be energized. Relay R16 is a time delay relay of a dashpot type, which delays the closing of its contact for 3 or 4 seconds until the tape is up to speed and lamp is at full brilliancy. After 3 or 4 seconds, relay R16 operates and its $R16a_1$ contact completes the circuit to the bus feeding relays R14 and R15 making the machine ready to start its count and print cycles.

The general purpose of relays R13, R14, and R15 is to control the counting and printing cycle of the machine. Relay R13 initiates the counting period and relay R14 the printing. In addition to this general purpose, these relays also provide three important interlocks to prevent faulty operation. The first interlock is needed when the machine is first started and the time delay contact closes. There is no control over the exact time which this contact closes and hence provisions must be made to prevent an abortive cycle at an inappropriate time. The manner in which this is accomplished is as follows: When the time delay contact $R16a_1$ closes, relay R15 will not operate until the cam switch controlled relay R12 falls out. Relay R15 will then close a "make ready" $15a_1$ contact in the circuit of relay R13. As soon as the cam relay R12 is energized, the $R12a_1$ contact will cause relay R13 to operate and initiate the count period. Regardless of when $R16a_1$ closes, R13 cannot operate until the cam and tape have revolved around so that it operates upon a counting period as it should.

Relays R1, R2, R3 and R4 control the counters and printer. Relay R1 sets up the counters for the counting period. It is energized from the control chassis by means of the $R13a_1$ contact. Relay R1 self locks through a "make before break" transfer point R1*ad*. This same transfer restores relay R4 so that the counter's reset is removed.

As soon as relay R14 on the comparator operates to start the printer, the $R14a_1$ contact will operate relay R2 on the printer which will apply the safety bias. As soon as the safety bias is applied, the five R2*a*'s contacts will close and cause relay R3 to operate. Relay R3, in turn, operates the printer clutch release, thus starting the printer.

It will be noticed that relays R1, R2, and R3 all self-lock and hence that they must be restored by some means. This is done by the switch S*f* which is operated by a cam on the printer at the very end of the printing cycle. Thus, relays R1, R2 and R3 hold in until the printing is complete. At that time, S*f* opens; relays R1, R2 and R3 restore; and relay R4 operates. Relay R4 contacts in the circuit of relay R15 then close to signify that the printing cycle is complete and hence that in as far as the printer is concerned, that another cycle of operation can be started safely.

Relays R20, R21, R22, R23, the tape advance switch K-16 and the tape advance solenoid are associated with the tape advancing controls.

The tape advance mechanism operates when one-half revolution clutch 502 is released. This clutch is released by a solenoid 503 called the tape advance solenoid. The mechanism includes two peak cams which operate micro switches. One peak cam closes micro switch **RG1*a* in Figure 3B when the clutch is in its home position thus providing a signal to indicate that the tape advance is complete. The other peak cam closes micro switch G-2*a*** in Figure 3B when the clutch has made one-fourth of a revolution, providing a signal to indicate that the tape advance has started and also providing a means of restoring the tape advance solenoid to prevent a recycle of tape advance.

When relays R2 operate in the counter printer they complete the circuit to, and operate relay R20. The *a* contacts of relay R20 complete the operating circuit to the tape advance solenoid which releases the clutch and starts the tape advance. The *b* contacts of relay R20 open the first operating circuit to relay R21, thereby restoring relay R21. When the clutch has made one-fourth of a revolution microswitch G-2*a* is closed, G-2*a* causes relay R22 to operate. Relay R22 locks itself, operates relay R23 and restores relay R20. Relay R20 in restoring the tape advance solenoid preventing a recycle of tape advance. Relay R23 in operating prepares a second operating circuit to relay R21. When the clutch has made its one-half revolution, RG1*a* is closed. Relay R21 operates indicating that the advance is complete, and prepares an operating circuit to relay R15, which will operate when the printer is cleared and the relays R4 have operated. Relay R15 when operated indicates that all print and advance operations are complete, making it safe to start a count cycle.

In some types of operation, the machine makes a large number of rounds in which printing is undesired and should be suppressed. Printing is to take place only after the rounds in which an electronic (rare events) signal is received which turns on the tube and causes relay R17 to pull up. Such a control has been provided and can be set in operation by throwing the switch $K13a_1$.

Assuming that the machine has gone through a counting period without having relay R17 operated, relay R14 and relay R2 will operate as usual to attempt to start the printer. However, if relay R17 has not operated, and since $K13b_2$ is open, the five R2*a*'s contacts in relay R3 circuit cannot energize relay R3 to start the printer. Thus, the printing is suppressed for that round. For some later round, relay R17 may operate and printing will take place for that round as usual.

It will be remembered, though, that relays R1 and R2 on the printer have operated and must be cleared out by some means other than by S*f* since the printer will not be turning to open this switch if the printing is suppressed. These relays are cleared out by relay R18 in the control chassis. When relay R18 operates it opens the R18*b* contact in the ground common of relays R1 and R2. This contact, when opened, will restore relays R1 and R2 for print suppression. Relay R18 on the comparator is operated by means of the five R2*a*'s contact in its circuit and through the R17*b* contacts that must be closed because relay R17 did operate to signal the printer to print. Thus, the machine continues to run, with all printing suppressed except the rounds during which relay R17 does operate, the printer prints and clears its own relays as usual by operating S*f*. The five R2*a* contacts in the counter printer then operate relay R19 instead of R18 because relay R17 has operated and made the R17*ac* transfer. Relay R19, in turn, breaks open the circuit of relay R17 and thus clears it for the next round.

The purpose of the automatic shutdown control is to stop the machine, if desired, every time an electronic (rare event) signal causes relay R17 to operate. This shutdown feature can be operated in conjunction with printing suppression or independently by itself.

In the case that it is to be used independently, the counting and printing circuits will operate in normal manner until relay R17 is operated during a counting period. At that time, a R17*ad* make ready contact will be closed in the circuit of relay 19. When the five R2*a* contacts close, and the printing of the results of that round is started, relay R19 will operate and break open the $R19b_1$ contact in the main relay R11, thus stopping the machine.

With this automatic shutdown feature, it is very important to prevent the tapes from advancing. This is done by putting a R17*bc* contact in the circuit of relay R20. Thus, if during the count period, relay R17 operates, it immediately throws the advancing circuit out of action. The R17*ac* transfer in relay R21 causes relay R21 to operate when the five R2*a* contacts are closed. Relay R21, then, self-locks and prevents the relay R20 from being operated even though the R17*bc* contact closes again before the R2*a* contacts are opened.

The automatic shutdown and printing suppression can be used in conjunction, if desired, by throwing both K–13 and K–14 switches. With this set-up, the machine will make a number of rounds without printing until relay R17 operates. At that time, the printer will print the results of that round and the machine will shut down automatically. After the machine has been stopped by the electronic shutdown, it will be necessary to restart the machine by pushing the restart button in the circuit of relay R11. The regular start switch cannot be used for this purpose because it has several other clearing contacts (to be described in details of starting switch), which hang up the machine as long as this switch is depressed.

If the machine is interrupted part way through a cycle of operation, some of the relays may be self-locked and thus cause trouble when one attempts to start the machine again. In order to insure that all appropriate relays are cleared in starting, certain additional contacts are operated by the start switch K–11. For example, K–11*b* opens up the common lead to relays R1, R2 and R3 on the printer. Also, K–11*a* operates relay R23 to insure that the stepping switch is cleared to zero. Relays R13, R14, R15 and R16 are automatically cleared by the R11$a_1$ contact which opens when the machine is stopped.

The tape advance switch K–16 is provided in order that the comparator may be operated without tape advance in order to align tapes etc.

In its normal position the tape advance switch opens the operating circuits to relays R18, R19, R20, R22 and R23 and places a shunt on the R21$a_2$ contacts in the operating circuit of relay R15. This allows the comparator to operate without tape advance.

The stop print switch K17*b* is provided in order that comparator may be run without printing or advancing.

In the stop print position (locking) the stop print switch through its *b* contact opens the operating circuit to relays R1, R2, and R3; and prevents printing and tape advance.

The predetermining counter shutdown is used to stop the comparator unit after a predetermined number of tape advances have been made. It consists of a solenoid operated Veeder-Root counter which may be set to open a *b* contact after the desired number of operations have been made, and it operates each time the comparator makes an advance through relay contacts. Its *b* contact is placed in the operating circuit of relay R11, as shown in Figure 3B.

An interlock to prevent the comparator from stopping during an advance cycle is provided by shunting the counters *b* contact with a R12*b* and K–16*a* contact in series.

The power to energize relays R1, R2, R3 and R4 is supplied by the diode section of the 117N7 switch tubes. The power for all other control circuit relays is supplied by an auto transformer and bridge rectifier 310 in the power supply chassis of the amplifier unit.

In the following discussion of the sequence of operations only the control circuit sequence will be described in detail.

It is assumed that at the starting point of this discussion, the power switches on the counter printer and on the amplifier chassis are in the "On" position. The motor and lamp switches on the comparator are in the "On" position. The tape advance switch is in the tape advance position (locking). Tapes have been placed on the machine and properly aligned.

With the above setup, relays R4 are operated. The impulse sharpener tubes have no screen grid potential applied. The 2C4 Thyratrons have no plate potential applied. All 2C4's have normal negative grid bias applied except the zero tubes which have their grids at cathode potential. The explanation follows Figures 3A to 3D.

(1) The start switch (K–11) is operated momentarily.

(2) When the start switch is closed:

A. Relay R11 operates through the predetermining counter shut-down R*b*, K–12*b*, K–14*b* and R19*b* in parallel and K11$a_2$ contacts.

(1) Completes a locking circuit on itself by shunting K11$a_2$ contacts with R11$a_1$.

(2) Completes the operating circuit to the main tape drive motor, the tape advance clutch motor and the projector lamp and its cooling fan motor.

(*a*) The tape loop revolves, etc. The tape phase cam revolves, operating and restoring relay R12 through micro switch G–3*a*.

(3) Completes the operating circuit to relay 16.

(4) Prepares operating circuits to relays R10, R13, R14, R15, R18, R19, R20, R22 and R23.

B. Relay R21 operates through R20*b* and K11$a_1$ contacts.

(1) Completes a locking circuit on itself by shunting K11$a_1$ contacts.

(2) Prepares an incomplete locking circuit to relay R15.

(3) Relay R16 operates after a time delay through R11$a_1$ contacts.

A. Prepares operating circuits to relays R14 and R15.

B. If relay R12 is restored at the time that relay R16 operates relay R16 completes the operating circuit to relay R15. Otherwise relay R12 in restoring, completes relay R15's operating circuit.

(4) Relay 15 operates through R16$a_1$, R12$b_3$, R21$a_2$, five R4*a*'s and R11$a_1$ contacts.

A. Completes a locking circuit on itself by shunting the R12$b_3$ contact.

B. Prepares an operating circuit to relay R13.

(5) Tape phase cam closes micro switch G–3*a*.

A. G–3*a* completes the operating circuit to relay R12.

(6) Relay 12 operates through G–3*a* contacts.

A. Completes the operating circuit to relay R13 by R12$a_1$.

B. Opens the incomplete operating circuit to relay R10.

C. Opens the incomplete operating circuit to relay R14.

D. Opens the operating circuit to relay R15.

(1) Relay R15 remains operated through its locking circuit.

E. Opens the shunt circuit on the predetermining counter shut down contact R*b*.

(1) This interlock prevents the predetermining counter (when being used) from shutting down machine during tape advance.

(7) Relay R13 operates through R15$a_1$, R12$a_1$ and R11$a_1$ contacts.

A. Completes a locking circuit on itself through R13$a_2$, R14*bd*, R10*b* and R11$a_1$ contacts.

B. Completes the operating circuit to relay R1.

C. Prepares the operating circuit to relay 14.

(8) Relays R1 operate through K–11*b* and R18$b_1$, and K13$b_1$ in parallel, S*f* and R3*b* in parallel and R13$a_1$ contacts.

A. Complete locking circuits by shunting the R13$a_1$ contact in their circuits.

B. Open the operating circuit to relay R4.

C. Place plate potential on all 2C4's except the transfer tubes.

(1) Zero tubes fire (preset) because their grids are at cathode potential.

D. Place positive potential on screen grids of the impulse sharpeners.

(9) Relays R4 restore:

A. Open the locking to relay 15.

B. Place negative grid bias on zero tubes.

C. Apply plate potential on 2C4 transfer tubes.

(1) Impulse sharpeners and counters are now ready to function. Impulses received by the counters fire the tubes, registering number of impulses by the position of the fired tubes in the counting rings. The following pulse sequence during the count cycle is best followed on Figure 2. The amplifier chassis is set up in such a manner that #1 electronic counter will count four element coincidences, #2 will count three element coincidences, #3 will count two element coincidences, #4 will count single coincidences and #5 will count positions of overlap or the number of coincident count holes. Light passes through coincident holes in the tapes, passes through slots in the mask, through the dispersing prisms, through the cylindrical lens and strikes the respective photo tubes. Light in Figure 2 falls upon cells Nos. (counting from top to bottom) 2, 3, 4, 5, 7, 8 and the count hole cell. The above named cells cause their corresponding 6J7 amplifiers to produce negative pulses, as seen from Figures 3A to 3D. These negative pulses from the 6J7's are transmitted to their corresponding 6SH7's in the amplifier chassis. The 6SH7's 2, 3, 4, 5, 7, 8 and the count hole 6SH7 produce positive pulses in their plate circuits. The count hole 6N7 produces a positive pulse which is transmitted to #1 6SJ7 of electronic counter #5. #1 6SJ7 causes #2 6SJ7 to produce a positive pulse which is transmitted to the units column of the counter, causing the 2C4 adjacent to the fired 2C4 to fire. The latter fired 2C4 causes the previous 2C4 to extinguish. #2 and 3 6SH7 produce positive pulse simultaneously causing #3 6N7 to produce a positive pulse which is transmitted to electronic counter #3, causing #3 electronic counter to advance one position. #4 and 5 6SH7's produce positive pulses but #4 6N7 does not operate because #6 6SH7 remains conducting. #5 6N7 does not operate because #9 and 10 6SH7's remain conducting.

(10) Relay R15 restores.

A. Opens its incomplete locking circuit.

B. Opens relay R13 operating circuit.

(1) Relay R13 remains operated through its own locking circuit.

(11) At the end of the counting period, the tape phase cam allows micro switch G–3*a* to open.

A. G–3*a* opens the operating circuit to relay R12.

(12) Relay R12 restores:

A. Completes the operating circuit to relay R14.

B. Prepares the operating circuit to relay R10.

C. Opens the incomplete operating circuit to relay R13.

(1) Relay R13 remains operated through its locking circuit.

D. Places a shunt on the predetermining shut-down counter contacts.

(13) Relay R14 operates through $R12b_2$, $R13a_3$, and $R11a_1$ contacts.

A. Completes a locking circuit on itself through $R12b_2$, R14*ad*, R10*b* and $R11a_1$ contacts.

B. Completes the operating circuit to relays R2.

C. Opens relay R13's locking circuit.

(14) When relay R14 is closed:

A. Relays R2 operate through K–11*b*, $K13b_1$, and $R18b_1$ in parallel and $R14a_1$ contacts.

(1) Complete a locking circuit on themselves by shunting the $R14a_1$ contact.

(2) Complete the operating circuit to relay R10.

(3) Complete the operating circuit to relay R20.

(4) Complete the operating circuit to relay R3.

(5) Complete the operating circuit to relay R18.

(6) Place a negative bias (−150 volts) on the control grids of the first impulse sharpener tubes.

(*a*) Prevents any signal from getting into counters during the print cycle.

(7) Prepares operating circuit to relays R19, R22, and R23.

B. Relay R13 restores:

(1) Opens its own incomplete locking circuit.

(2) Opens relay R14's operating circuit.

(*a*) Relay R14 remains operated through its locking circuits.

(3) Opens relays R1 operating circuits.

(*a*) Relays R1 remain operated through their locking circuits.

(15) When relays R2 operate and relay R13 restores:

A. Relay R10 operates through $R12b_1$, five R2*a*'s and $R11a_1$ contacts.

(1) Opens the locking circuit on itself by shunting the five R2*a*'s contacts.

(2) Completes a holding circuit on relays R18 and R20.

B. Relay R20 operates through R23*b*, R22*b*, R17*bc* and K–14*b* in parallel, $K–16a_1$, five R2*a* and $R11a_1$ contacts.

(1) Completes the operating circuit to the tape advance solenoid.

(2) Opens the locking circuit to relay R21.

C. Relay R3 operates through K–11*b*, $R18b_1$ and $K13b_1$ in parallel.

(1) Completes a locking circuit on itself.

(2) Completes the operating circuit to the printer clutch release solenoid.

(3) Removes shunt on S*f* contacts.

(4) Places positive potential on screen grids of switch tubes.

D. Relay R18 operates through $R19b_2$, R17*b*, K–16*a*, five R2*a* and a R10*ac* in parallel, and $R11a_1$ contacts.

(1) Opens shunt $K13b_1$ contacts.

(16) When relays R10, R20, R3 and R18 operate:

A. Relay R14 restores:

(1) Opens its incomplete locking circuit.

(2) Prepares a locking circuit to relay R13.

B. Relay R21 restores:

(1) Opens relay R15's incomplete operating circuit.

(2) Opens its own incomplete locking circuit.

(3) Prepares a locking circuit to relay R23.

C. Tape advance solenoid operates.

(1) Release revolution clutch and allows tape advance to start.

D. Printer clutch solenoid operates through contact $R3a_2$.

(1) Allows printer to start scan cycle.

(17) When the tape advance and printer clutch solenoids operate:

A. Tape advance clutch revolves.

(1) When the tape advance clutch steps off its home position micro switch RG1*a* (operated by a peak cam) opens.

(2) When the clutch has made one-fourth of a revolution micro switch G–2*a* is closed then opened by a peak cam.

(3) When the tape advance clutch has made its full one-half revolution micro switch RG1*a* is again closed.

B. Printer operates.

(1) Scans the cathode of the 2C4 counting tubes.

(2) When scanning arms hit points corresponding to a conducting 2C4 the associated 117N7 switch tube conducts causing its trip magnet to operate and arrest the associated type wheel at the point corresponding to the conducting 2C4.

(3) At the end of the scan cycle S*f* is opened momentarily.

(4) At the end of the scan cycle the print impression is made and the printer returned to home position.

(18) When the advance clutch revolves and the printer operates.

A. Micro switch RG1*a* opens.

(1) Opens the incomplete second operating circuit to relay R21.

B. Micro switch G–2*a* closes.

(1) Completes the operating circuit to relay R22.

C. Relay R22 operates through G–2*a*, K–16*a*, R10*ac*, and five R2*a*'s in parallel, and $R11a_1$ contacts.

(1) Completes a locking circuit on itself by shunting G–2*a* by means of $R22a_1$.

(2) Opens the operating circuit to relay R20.

(3) Completes the operating circuit to relay R23.

D. Relay R20 restores:

(1) Opens the operating circuit to the tape advance solenoid.

(2) Prepares the locking circuit to relay R21.

E. Tape advance solenoid restores.

(1) Preventing recycle of advances.

F. Micro switch G–2*a* opens.

(1) Opens the operating circuit to relay R22.

(*a*) Relay R22 remains operated through its locking circuit.

G. Relay R23 operates through $R22a_2$, K–16*a*, R10*ac* and $R11a_1$ contacts.

(1) Completes a locking circuit on itself.

(2) Prepares the second operating circuit to relay R21.

(3) Opens the incomplete circuit to relay R20.

H. Micro switch RG1*a* closes when tape advance is complete.

(1) Completes the second operating circuit to relay R21.

I. Relay R21 operates through R23*a* and RG1*a* contacts.

(1) Completes a locking circuit on itself.

(2) Opens the locking circuit on relay R23.

(*a*) Relay R23 remains operated through its operating circuit.

J. S*f* is opened momentarily by the printer.

(1) Opens the operating circuits to relays R1, R2 and R3.

K. Relays R1 restore:

(1) Open their locking circuits.

(2) Opens the incomplete circuits to relay R2.

(3) Removes plate voltage from all 2C4's except transfer tubes.

(4) Removes screen grid voltage from impulse sharpener tubes.

(5) Complete the operating circuits to relay R4.

L. Relays R2 restore:

(1) Open their own locking circuits.

(2) Open incomplete operating circuits to relay R3.

(3) Open the operating circuit to relays R10, R18, R19, R20, R22, and R23.

(*a*) Operated relays remain operated through their holding circuit.

(4) Remove safety bias (—150 volts) from the grid of the first impulse sharpener.

M. Relay R3 restores:

(1) Opens its own locking circuit.

(2) Opens circuit to printer clutch release.

(3) Removes positive screen potential from the switch tube.

(4) Places shunt on S*f* contacts.

(19) Relay R1 operates through contacts R1*ad*·

A. Removes plate voltage from the transfer tubes.

B. Removes the negative grid bias from the zero tubes.

C. Completes the operating circuit to relay R15.

(20) Relay R15 operates through $R16a_1$, $R12b_3$, $R21a_2$, five R4*a*'s and $R11a_1$ contacts.

A. Completes a locking circuit on itself.

B. Prepares the operating circuit to relay R13.

(1) Indicates all prints and advance operations are complete and therefore it is safe to start a count cycle.

(21) Micro switch G–3*a* operates:

A. Completes the operating circuit to relay R12.

(22) Relay R12 operates through contacts G–3*a*.

A. Places shunt on predetermining counter shutdown contacts.

B. Completes the operating circuit to relay R13.

C. Opens the operating circuit to relay R10.

(23) Relay R10 restores:

A. Opens the operating or holding circuits to relays R10, R18, R22 and R23.

B. Prepares the locking circuit to relay R14.

(24) When relay 10 restores:

A. Relay R18 restores.

(1) Places shunt on $K13b_1$ contacts.

B. Relay R22 restores.

(1) Opens the incomplete locking circuit to relay R23.

(2) Opens its own locking circuit.

(3) Prepares the operating circuit to relay R20.

C. Relay R23 restores:

(1) Opens its own locking circuit.

(2) Opens the second operating circuit to relay R21.

(*a*) Relay R21 remains operated through its own locking circuit.

(3) Prepares the operating circuit to relay R20.

D. Relay R13 operates, etc.

What is claimed is:

1. A device for analyzing data comprising, a plurality of records, electronic means for comparing data on said records, mechanical drive means for continuously moving all of said records relative to said electronic means and periodically relative to each other, and means for indicating desired data from said records.

2. An analytical device comprising, a plurality of records including data punched thereon, electronic means responsive to said data, mechanical drive means for continuously moving all of said records relative to said electronic means and periodically relative to each other, and means for indicating desired data from said records.

3. An analytical device comprising, a plurality of records including data thereon, electronic means responsive to said data and generating impulses therefrom, mechanical means for continuously moving all of said records relative to said electronic means and periodically relative to each other, and means responsive to said impulses for indicating desired data from said records.

4. An analytical device comprising, a plurality of records including data thereon, electronic means responsive to said data and generating impulses therefrom, mechanical means for continuously moving all of said records relative to said electronic means and periodically relative to each other, and electronic means for counting said impulses.

5. An analytical device comprising, a plurality of records including data thereon, electronic means responsive to said data and generating impulses therefrom, mechanical means for continuously moving all of said records relative to said electronic means and periodically relative to each other, electronic means for counting said impulses, and means for scanning said counting means.

6. An analytical device comprising, a plurality of records including data thereon, electronic means responsive to said data and generating impulses therefrom, mechanical means for continuously moving all of said records relative to said electronic means and periodically relative to each other, and electronic means for counting said impulses.

7. An analytical device comprising, a light source, a plurality of record strips forming loops with data thereon, said loops being arranged to move in parallel paths so as to intercept the light beam, the plane of each loop being normal to the longitudinal axis of the light beam and spaced apart a predetermined distance along the axis of said light beam, means for continuously moving all of said loops, means for periodically moving one loop with respect to another, electronic means for generating impulses responsive to the data on said loops, and electronic means for counting said impulses.

8. An analytical device comprising, a source of light rays, a plurality of strips forming loops with data holes punched therein, said loops being arranged to intercept the light rays in parallel paths normal to the longitudinal axis of said rays, said loops being in spaced apart relation along the axis of said rays, means for continuously moving all of said loops across the path of said light rays, means for periodically moving one loop relative to another, electronic means for generating an impulse when said light rays pass sequentially through coinciding holes in said loops, and electronic means for counting said impulses.

9. A data analysis apparatus comprising a plurality of record tapes, each tape bearing data indicia thereon in lines transverse to the longitudinal dimension of said record tape, a tape transport mechanism for each tape for continuously advancing the tape in a longitudinal direction, synchronous drive means for all the said tape transport mechanisms, a scanning mechanism for simultaneously scanning the data indicia on all said tapes by frames, each frame including a predetermined number of data indicia lines, said scanning mechanism comprising a plurality of electrical pick-up elements each responsive to a particular line of data indicia within a tape frame to generate an electrical impulse when data indicia appears on all of said tapes in a corresponding location within the line, means connecting predetermined ones of said pick-up elements in scanning groups, electrical counter means responsive to the electrical impulses of each scanning group and means to shift the relative phase relationship of said tapes with respect to one another by a predetermined number of data indicia lines.

10. A data analysis apparatus according to claim 9 wherein said record tapes comprise punched tapes or opaque material and said pick-up elements comprise photo-electric devices.

11. A data analysis apparatus according to claim 10 wherein said record tapes comprise endless loops.

12. A data analysis apparatus according to claim 11 wherein said means to shift the relative phase relationship of the tapes is responsive to a predetermined longitudinal travel of one of said tapes.

13. A data analysis apparatus comprising a plurality of record tapes, each tape bearing data indicia thereon in lines transverse to the longitudinal dimension of said record tape, a tape transport mechanism for each tape adapted to continuously advance the tape in a longitudinal direction, synchronous drive means for the tape transport mechanism of all said tapes, a scanning mechanism for simultaneous scanning of the data indicia on all of said tapes by frames, each frame including a predetermined number of data indicia lines, said scanning means consisting of a plurality of pick-up elements each responsive to a particular line of data indicia within a tape frame to produce a control impulse when data indicia appears on said tapes at corresponding locations within the line, impulse counter means responsive to the pick-up elements and means to shift the relative phase relationship of said record tapes with respect to one another by a predetermined number of data indicia lines.

14. A data analysis apparatus for analyzing data indicia on a plurality of record tapes comprising a continuous movement tape transport mechanism for each record tape, synchronous drive means for all of said tape transport mechanisms, a scanning mechanism for said data indicia located in proximity to the path of travel of the tapes, said scanning mechanism comprising a plurality of pick-up elements simultaneously responsive to data indicia within a frame of data indicia on all of said tapes, each pick-up element adapted to produce a control impulse when data indicia appears on said tapes at corresponding locations within said frame, impulse counter means responsive to said pick-up elements and means to shift the phase relationship of at least one of said record tapes with respect to the others.

15. A data analysis apparatus for analyzing data indicia on a plurality of record tapes comprising a continuous movement record transport mechanism for each record tape, synchronous drive means for all of said record transport mechanisms, a scanning mechanism for said data indicia located in proximity to the path of travel of the tapes, said scanning mechanism comprising a plurality of pick-up elements uniformly linearly spaced along the path of travel of the tapes, means to connect said pick-up elements in a series of groups, each group containing a different number of pick-up elements and counting means responsive to the output of each group of pick-up elements.

16. A data analysis apparatus according to claim 15 wherein said pick-up elements are photo-electric cells and the counting means are electronic counting systems.

References Cited in the file of this patent

UNITED STATES PATENTS

| | | |
|---|---|---|
| 1,838,389 | Goldberg | Apr. 5, 1928 |
| 2,111,154 | Nichols | Mar. 15, 1938 |
| 2,172,330 | Bryce | Sept. 5, 1939 |
| 2,209,342 | Loughridge et al. | July 30, 1940 |
| 2,254,932 | Bryce | Sept. 2, 1941 |
| 2,320,338 | Bryce | June 1, 1943 |
| 2,401,657 | Mumma | June 4, 1946 |
| 2,408,754 | Bush | Oct. 8, 1946 |
| 2,484,081 | Dickinson | Oct. 11, 1949 |